United States Patent [19]

Moon

[11] Patent Number: 5,175,715
[45] Date of Patent: Dec. 29, 1992

[54] MAGNETO-OPTICAL RECORDING MEDIUM ANTI-REFLECTIVE LAYERS MADE OF AMORPHOUS THIN FILMS HAVING A SPECIFIC REFLECTIVE INDEX RANGE

[75] Inventor: Hyuk Moon, Seoul, Rep. of Korea

[73] Assignee: Goldstar Co., Ltd., Rep. of Korea

[21] Appl. No.: 739,025

[22] Filed: Aug. 1, 1991

[30] Foreign Application Priority Data

Aug. 3, 1990 [KR] Rep. of Korea ............... 90-11942

[51] Int. Cl.[5] ............... G11B 13/04; G11B 11/12; G11B 11/10; G11B 7/24
[52] U.S. Cl. ............... 369/13; 369/275.4; 369/275.5; 369/288; 369/286; 428/694
[58] Field of Search ............... 369/275.4, 13, 275.5, 369/284, 286, 288, 100; 360/131, 59, 114; 428/694, 900; 365/122

[56] References Cited

U.S. PATENT DOCUMENTS

| | | | |
|---|---|---|---|
| 4,466,035 | 8/1984 | Connell et al. | 369/13 |
| 4,544,443 | 10/1985 | Ohta et al. | 369/13 |
| 4,556,291 | 12/1985 | Chen | 369/13 |
| 4,559,573 | 12/1985 | Tanaka et al. | 369/13 |
| 4,569,881 | 2/1986 | Freese et al. | 428/900 X |
| 4,658,388 | 4/1987 | Ishiwatari et al. | 369/13 |
| 4,680,742 | 7/1987 | Yamada et al. | 369/13 |
| 4,800,112 | 1/1989 | Kano et al. | 428/900 X |

FOREIGN PATENT DOCUMENTS 61-243976 10/1986 Japan.
61-243977 10/1986 Japan.
63-18546 1/1988 Japan.

*Primary Examiner*—Hoa Nguyen
*Attorney, Agent, or Firm*—Morgan & Finnegan

[57] ABSTRACT

An optical magnetic disk is disclosed having an anti-reflective layer thereon for enhancing the Kerr rotation angle ($\theta k$) and the Faraday effect ($\theta f$), which comprises a first anti-reflection layer and a second anti-reflective layer coating of an amorphous material forming a thin film layer coating composed of $As_{40}Se_{50-x}S_xGe_{10}$ on the upper and/or the lower surface of a recording layer, selectively, in which x is between 15 to 40, the reflective index (n) is in the range of 2.5 to 2.7, each of the thicknesses of the first and the second anti-reflective layers is between 600–660 Å and 250–350 Å, and the Kerr rotation angle ($\theta k$) of the amorphous thin film is 1.55° at maximum.

6 Claims, 2 Drawing Sheets

MAGNETO-OPTICAL RECORDING MEDIUM ANTI-REFLECTIVE LAYERS MADE OF AMORPHOUS THIN FILMS HAVING A SPECIFIC REFLECTIVE INDEX RANGE

BRIEF DESCRIPTION OF THE INVENTION

The invention relates to an optical magnetic disk, and particularly to the improved magnetic optical characteristics of a disk structure.

BACKGROUND OF THE INVENTION

Conventionally, a nitride or an oxide dielectric layer are well known materials which are used to form protective or anti-reflective thin film layers, both of which are manufactured using the sputtering plating method.

As shown in FIG. 1, a conventional optical magnetic disk includes a substrate (or a transparent printed circuit board) 5. A first anti-reflective layer 6, formed from a nitride dielectric material, such as, $SiN_x$ is coated on substrate 5 in a thickness of about 800–1000Å on which a recording layer 7 is placed and covered by about 300Å of an amorphous RE-TM alloy, such as Tb, Fe and cobalt.

Also, a second anti-reflective layer 6a formed from a nitride dielectric layer of $SiN_x$ is placed upon the recording layer 7. A reflective layer 8, composed of metals, such as Aluminum (Al), Chromium (Cr) and Titanium (Ti) etc., is formed on the second anti-reflective layer 6a. The structure of FIG. 1 has a Kerr rotation angle ($\theta k$) and a Faraday effect ($\theta f$) due to the characteristics of the amorphous RE-TM material which is used with the recording layer 7.

When a laser beam passes through the substrate 5 of FIG. 1, the beam reaches the surface of the recording layer 7 by passing through the first anti-reflective layer 6, on which the beam is partly reflected and enhances the Kerr rotation angle ($\theta k$). The beam is also partly transmitted to improve the Faraday effect ($\theta f$). The reflective index, the permeability and the thickness of the first and the second anti-reflective layers 6 and 6a of FIG. 1 are detrimental to the Kerr rotation angle ($\theta k$) and the Faraday effect ($\theta f$).

$SiN_x$ or SiO materials have been used as the first anti-reflective layer 6 and the second anti-reflective layer 6a and create a problem because the reflective index (n) which adapts to the Kerr rotation ($\theta k$) and the Faraday effect ($\theta f$) is lowered by about 1.5–2.0.

If the reflective index (n) of materials used in the first and second anti-reflective layers 6 and 6a is increased, the Kerr rotation angle ($\theta K$) and the Faraday effect ($\theta f$) will also be increased. However, the inherently inferior reflective index of $SiN_x$ or SiO deteriorates the magnetic optical characteristics of the disk structure.

SUMMARY OF THE INVENTION

Accordingly, the main object of the invention is to provide an optical magnetic disk using materials of higher reflective index (n) for the anti-reflective layer to improve the Kerr rotation angle ($\theta k$) and the Faraday effect ($\theta f$).

According to the invention, an optical magnetic disk has anti-reflective layers formed thereon. The anti-reflective layers comprise a first anti-reflective layer of an amorphous thin film coated on either one of the upper or the lower surfaces of a recording layer for enhancing the Kerr rotation angle ($\theta k$) and a second anti-reflective layer of an amorphous thin film coating the other side of the recording layer for improving the Faraday effect ($\theta f$).

The amorphous thin film is composed of $As_{40}Se_{50-x}S_xGe_{10}$ in which x is between 15 to 40, and a reflective index (n) in the range of about 2.5 to 2.7. The thickness of the first anti-reflective layer is about 600–660Å, the thickness of the second anti-reflective layer is about 250 to 350Å, and the Kerr rotation angle ($\theta k$) of the amorphous thin film is 1.55° at maximum.

BRIEF DESCRIPTION OF THE DRAWINGS

The invention will be described in detail below by reference to the accompanying drawings, in which.

DETAILED DESCRIPTION OF THE INVENTION

Figure 1:
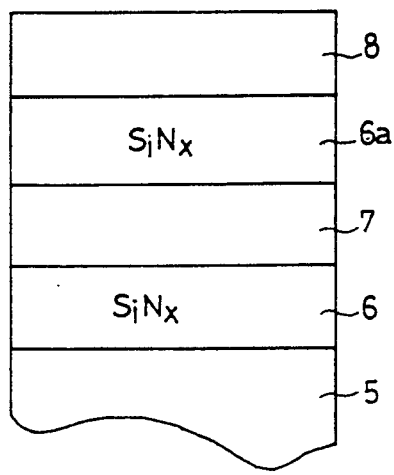
FIG. 1 is a view illustrating a conventional optical magnetic disk (Prior Art)
Figure 2:
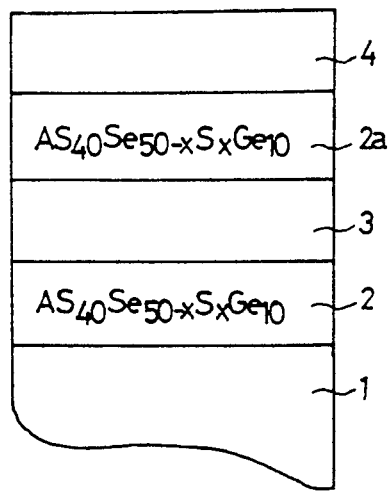
FIG. 2 is a view illustrating an optical magnetic disk according to the invention.

FIG. 2 is a view of an optical magnetic disk of the invention. The optical magnetic disk comprises a first anti-reflective layer 2 of about 600–660Å in thickness and formed by a sputtering method on a substrate 1. The anti-reflective layer material is $As_{40}Se_{20}S_{30}Ge_{10}$ and is obtained from $As_{40}Se_{50-x}S_xGe_{10}$ which is a dielectric material. The recording layer 3 is a metal alloy, such as Tb, Fe and Co, etc. and has a thickness of about 250Å on the first anti-reflective layer 2. A second anti-reflective layer 2a, formed from a dielectric material, such as $As_{40}Se_{20}S_{30}Ge_{10}$, is 250–350Å in thickness and covers the other side of recording layer 3. A reflective layer 4 which is a metal alloy, such as Al, in a thickness of about 600Å is placed on the second anti-reflective layer 2a.

The optical magnetic disk according to the invention operates as follows:

The radiation of the laser beam first transmits through the first anti-reflective layer 2 of a dielectric thin film of $As_{40}Se_{20}S_{30}Ge_{10}$, and then is reflected on the recording layer which is a thin film made of a metal alloy, such as Tb, Fe and Co, thereby improving the Kerr rotation angle ($\theta k$).

The larger the reflective index of the first anti-reflective layer 2 becomes, the more the Kerr rotation angle ($\theta k$) improves. Therefore, because the thin film of $As_{40}Se_{20}S_{30}Ge_{10}$ used in this embodiment has a reflective index of 2.6, sufficient Kerr rotation angle ($\theta k$) is obtained and a higher permeability, representing 90 to 91% in the wavelength of 780 nm–830 nm is achieved.

Figure 3:
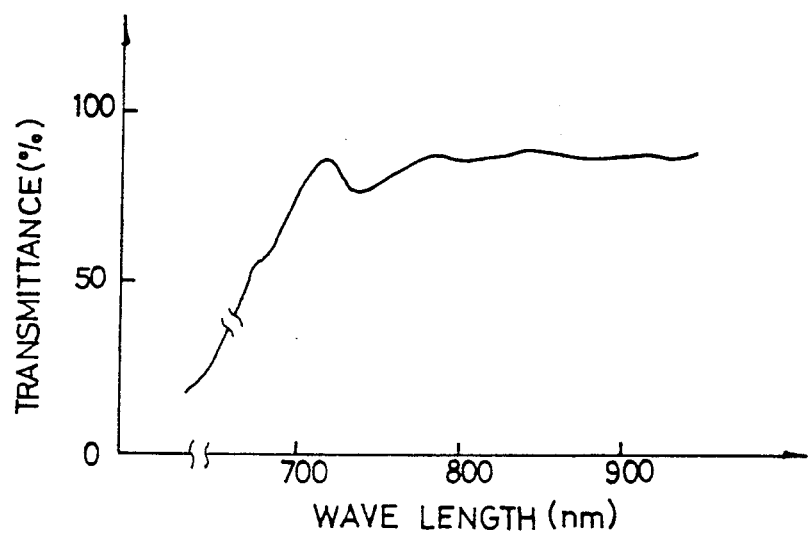
FIG. 3 is a graph showing the variance in the permeability of an optical magnetic disk according to the invention; and, FIG. 4 is a graph showing the Kerr rotational angle ($\theta k$) of the instant invention and that of a conventional optical magnetic disk.

As shown in FIG. 3, he invention reveals higher permeability in the wavelength of semiconductor lasers which are used as the read-out optical source.

Figure 4:
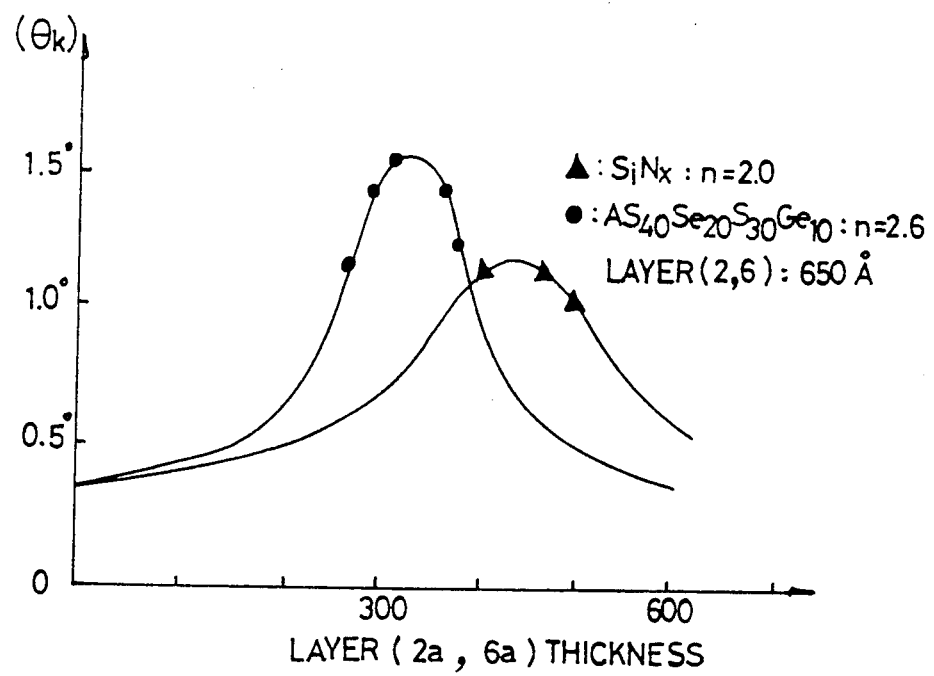

Also, the laser beams developing the Faraday effect ($\theta f$) through the recording layer 3 is reflected, on the reflective layer 4 after passing through the second anti-reflective layer 2a made of a dielectric material. Similarly, as the reflective index (n) of the second anti-reflective layer 2a increases, the more the Faraday effect ($\theta f$) is enhanced. Thus, the embodiment of the invention as shown in FIG. 4 can obtain higher Kerr rotation angles (74 k) shown by the marks ● as compared to the maximum angles obtained using the reflective layers made from previous dielectric material as indicated by the mark Δ. The maximum value of the Kerr rotation angle ($\theta k$) is respectively 1.2° for the prior art and 1.55° for this embodiment.

As described above, the invention has an anti-reflective layer formed of a thin film of $As_{40}Se_{50-x}S_xGe_{10}$ so that even though the permeability in the range of the visual light beam is inferior, higher permeability to the wavelength of semiconductor laser beams for reading a light source by the optical magnetic disk is obtained, and superior recording sensitivity is achieved. Furthermore, the invention has a higher reflective index (n), which improves and increases the Kerr rotation angle ($\theta k$) as compared to previously used materials.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. An optical-magnetic disk recording medium, comprising:
   a substrate;
   a magneto-optical recording layer, formed on said substrate;
   a first anti-reflective layer made of an amorphous thin film, formed on one side of said recording layer, for enhancing the Kerr rotation angle of the medium;
   a second anti-reflective layer made of an amorphous thin film, formed on the other side of said recording layer, for improving the Faraday effect on said medium; and,
   wherein the reflective index (n) of each of said thin films is in the range of about 2.5 to 2.7.

2. An optical-magnetic disk recording medium of claim 1, wherein the thickness of the first anti-reflective layer is in the range of 600Å to 660Å, and the thickness of the second anti-reflective layer is in the range of 250Å to 350 Å.

3. An optical-magnetic disk recording medium of claim 1, wherein the maximum Kerr rotation angle of the first anti-reflective layer of amorphous thin film is 1.55°.

4. An optical-magnetic disk recording medium, comprising:
   a substrate;
   a magneto-optical recording layer, formed on said substrate;
   a first anti-reflective layer made of an amorphous thin film, formed on one side of said recording layer, for enhancing the Kerr rotation angle of the medium;
   a second anti-reflective layer made of an amorphous thin film, formed on the other side of said recording layer, for improving the Faraday effect on said medium; and,
   wherein said amorphous thin films are composed of $As_{40}Se_{50-x}S_xGe_{10}$, in which the range of 15 to 40, and the reflective index (n) of each of said thin films is in the range of about 2.5 to 2.7.

5. An optical-magnetic disk recording medium of claim 4, wherein the thickness of the first anti-reflective layer is in the range of 600Å to 660Å, and the thickness of the second anti-reflective layer is in the range of 250Å to 350 Å.

6. An optical-magnetic disk recording medium of claim 4, wherein the maximum Kerr rotation angle of the first anti-reflective layer of amorphous thin film is 1.55°.

* * * * *